Aug. 30, 1938.  L. J. BISHOP  2,128,795
AUTOMATIC SPEED ADJUSTING DEVICE FOR MULTIPLE DRIVE CONVEYER SYSTEM
Filed Nov. 28, 1932  2 Sheets-Sheet 1
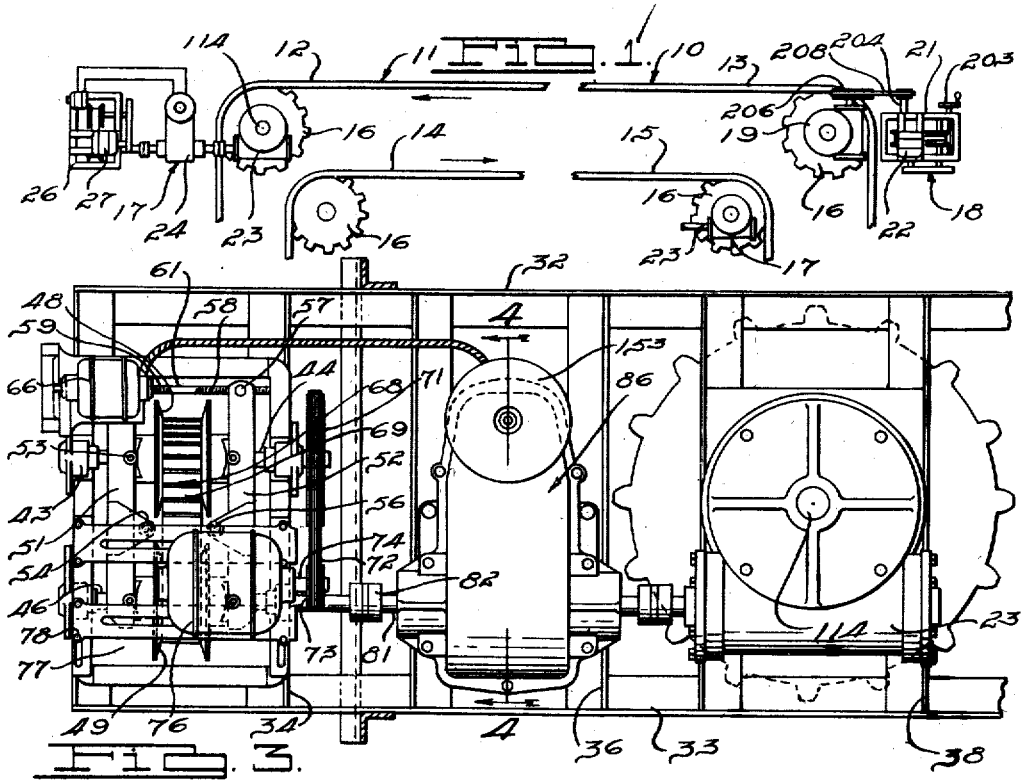
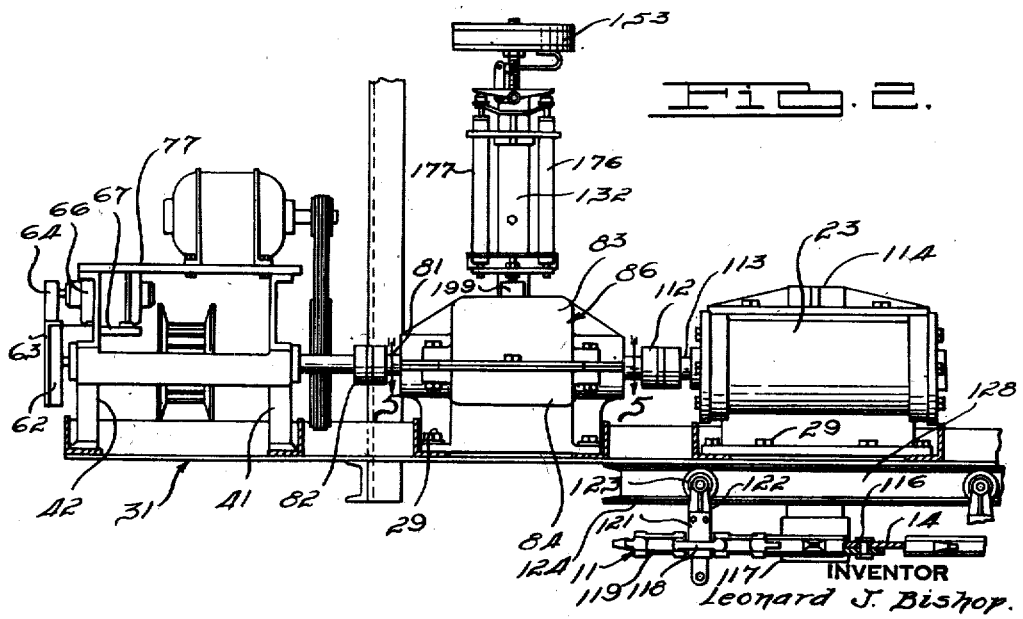
INVENTOR
Leonard J. Bishop.
BY
Harness, Dickey, Pierce & Hanns
ATTORNEYS.

Aug. 30, 1938.   L. J. BISHOP   2,128,795
AUTOMATIC SPEED ADJUSTING DEVICE FOR MULTIPLE DRIVE CONVEYER SYSTEM
Filed Nov. 28, 1932   2 Sheets-Sheet 2
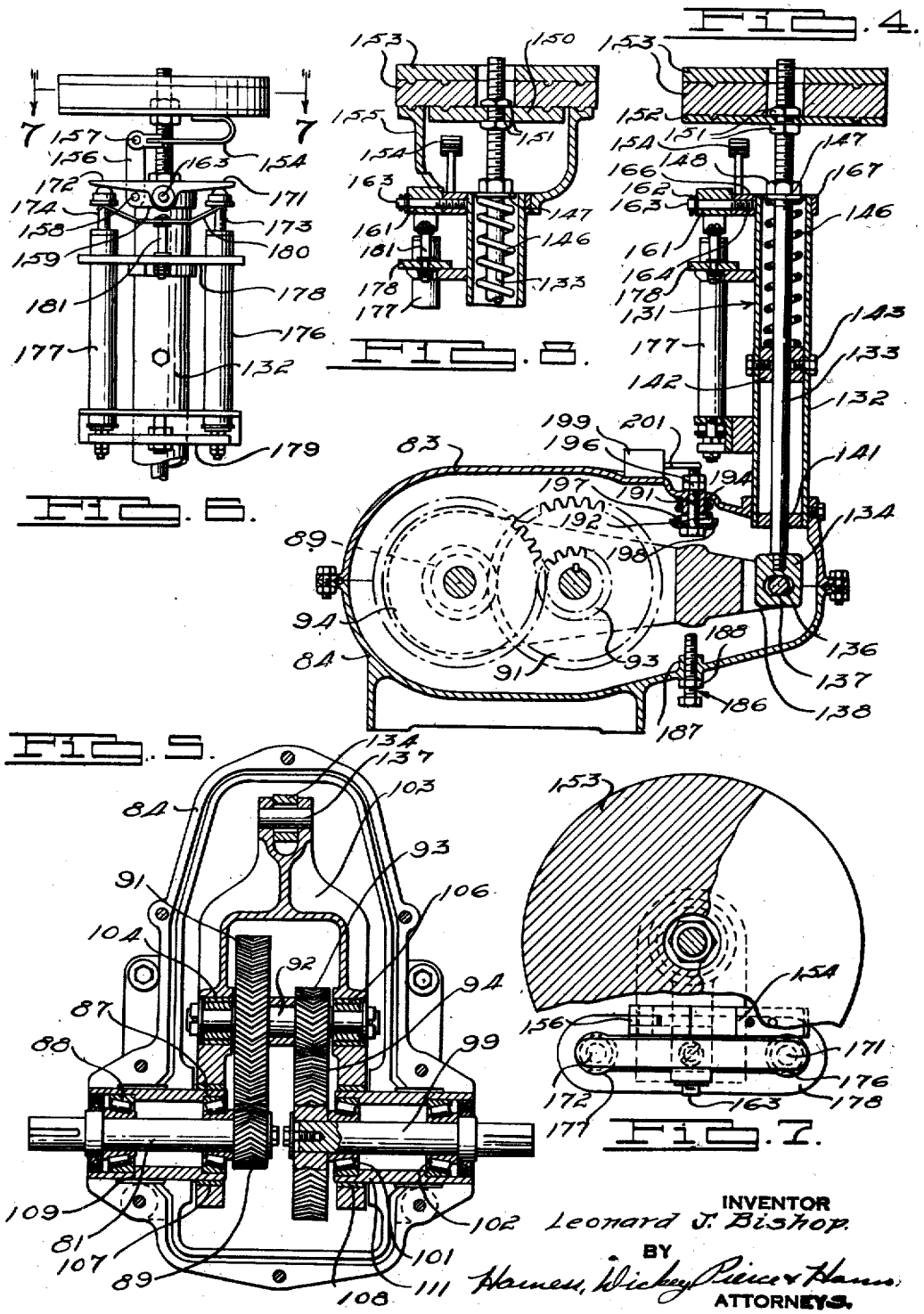
INVENTOR
Leonard J. Bishop.
BY
ATTORNEYS Patented Aug. 30, 1938

2,128,795

UNITED STATES PATENT OFFICE 2,128,795

AUTOMATIC SPEED ADJUSTING DEVICE FOR MULTIPLE DRIVE CONVEYER SYSTEM

Leonard J. Bishop, Detroit, Mich., assignor to Mechanical Handling Systems, Inc., a corporation of Michigan Application November 28, 1932, Serial No. 644,591

4 Claims. (Cl. 198—203)

This invention relates to devices for controlling the application of mechanical power and particularly to article conveying systems of the type now generally being employed in large factories and elsewhere for carrying articles in the process of manufacture from one work station to another within a plant and where certain operations are performed and additions made to the product thus being carried.

The invention also relates to systems of this general character in which a plurality of driving units are employed about the plant for driving different sections of a chain or other continuous conveying device employed in the system for supporting the products in the aforesaid process of manufacture.

An object of the invention is to provide a device capable of controlling the relative speed of two moving bodies and in response either to variations in speed or torque between the two, as occurs for example in strip mills, dynamometers, conveying systems and the like.

Another object of the invention is to provide a differential device capable not only of responding to variations in speed between two moving mechanical or other parts but is capable of so adjusting the parts associated therewith as to compensate for, or to correct such variation in speed.

Another object of the invention is to provide a mechanism capable of automatic speed adjustment to maintain a predetermined pull upon a driven member or product.

Another object of the invention is to synchronize the speed relationship between all of the various driving units employed in the system in order to insure that each unit will substantially do its equal share of the work involved in operating the conveyer.

Another object of the invention is to provide a single manually adjustable master conveyer driving unit and one or more automatically adjustable auxiliary driving units which are employed in driving a single conveyer machine or similar unit where a predetermined torque is desired.

Another object of the invention is to provide a plurality of auxiliary driving units for a single continuous conveyer or other system and each of which is rigidly mounted relative to the others and the entire system and is so constructed as to respond to any variations in the pull or speed of the several units and to compensate for such variations by decreasing or increasing the speed of the individual units until the desired proportion of the entire load is carried thereby.

Another object of the invention is to provide a stationary and easily installed auxiliary driving unit for multiple driving unit conveying systems in which the speed of the driving unit is controlled by a normally balanced arm which varies the operation of the unit in such manner as to cause the unit to carry its proportionate share of the entire load.

Another object of the invention is to provide a multiple driving unit conveyer system which is more economical to construct and to install, and is more reliable and accurate in its operation than the multiple unit conveyer systems heretofore employed.

Another object of the invention is to provide a multiple driving unit conveyer system having a master driving unit for controlling the operation thereof and which will be automatically disconnected from the system in the event anything occurs which might otherwise cause the overloading and eventual breakdown of the unit.

The embodiment of the invention disclosed for purposes of illustration, comprises generally a conveyer system embracing a continuous chain which is supported by pulleys and rails to travel throughout a manufacturing plant from one work station to another. The chain is guided and supported in any suitable manner as by the employment of rails, for example, and is driven at intervals by sprocket wheels, any number of which may be employed to prevent excessive loads from being transferred from one section of the chain to another. Sprocket wheels or other equivalent devices normally are employed at all bends in the chain, although not all such devices need be driven. The sprocket wheels in turn are driven by conveyer driving units, one of which may be equipped with a manually operable speed adjusting device to provide a master driving unit, while the others, or auxiliary driving units, are provided with automatic speed adjusting mechanism for synchronizing the operation of all of the units with the main driving unit to insure the carrying of substantially equal loads by all. The auxiliary units embracing the adjusting mechanisms each comprise a load responsive arm which is capable of movement in opposite directions either to increase or to decrease the speed of the unit as the speed of the conveyer is varied by manual adjustment of the master driving unit or otherwise. The driving units preferably are provided with means responsive to an overload upon the system for discontinuing the operation of the system to prevent injury to any of the principal units of mechanism employed.

For a better understanding of the invention, reference may now be had to the accompanying drawings in which:

Figure 1 is a diagrammatical illustration of a factory conveyer system embracing master and auxiliary conveyer system driving units.

Figure 2 is a fragmentary side elevational view of the conveyer system illustrated diagrammatically by Figure 1 and particularly illustrating one of the auxiliary driving units employed therein.

Figure 3 is a plan view of the driving unit structure disclosed by Figure 2.

Figure 4 is a transverse sectional view of the driving apparatus shown by Figures 2 and 3 as it might appear substantially in the plane of line 4—4 of Figure 3 and looking in the direction of the arrows thereon.

Figure 5 is a fragmentary horizontal sectional view of the driving mechanism as it might appear substantially in the plane of line 5—5 of Figure 2 and in the direction indicated by the arrows thereon.

Figure 6 is a fragmentary view of the controlling mechanism embraced in the driving unit illustrated by the preceding figures.

Figure 7 is a fragmentary horizontal sectional view of the controlling mechanism illustrated particularly by Figure 6 and as the structure might appear substantially in the plane of line 7—7 thereon with certain portions of the structure broken away in order better to illustrate the parts therebeneath.

Figure 8 is a view illustrating a slightly modified form of controlling mechanism embracing the principles of the invention.

Referring particularly to the drawings, in Fig. 1 there is illustrated diagrammatically a portion of an article conveying system 10 adapted to be employed in factories or elsewhere where such systems are desired. The conveying system 10 embraces a long continuous chain or conveyer 11 which winds about in any desired path throughout a factory or other establishment, and sections 12, 13, 14 and 15 of which are driven and/or guided by sprocket wheels 16, caterpillar chains, or other similar devices. While any number of sprocket wheels such as are illustrated at 16 may be employed in driving and/or changing the direction of motion of the chain 11, only a representative number are illustrated in the present conveying system. These sprocket wheels or other equivalent means may be located along the chain in any desired relation and at intervals the sprocket wheels may be driven by suitable driving mechanism units such as those indicated at 17 and 18. The distances between these units should be such that each will carry substantially an equal or other desired part of the entire load involved in moving the chain throughout the factory under normal conditions. Idling sprockets or other similar means may be employed wherever desired to change the direction of motion of the conveyer and it is deemed unnecessary to employ a driving unit.

The unit 18, which is employed as a master driving unit comprises a worm gear mechanism 19 for driving one of the sprockets 16, a so-called Reeves speed changing device 21 and a driving motor 22.

The auxiliary driving mechanism units 17 also embrace worm reduction gears indicated at 23, load responsive unit controlling mechanisms 24, Reeves speed changing devices 26 and driving motors 27, or other suitable variable speed driving mechanism.

Since the auxiliary driving unit embraces most of the elements of the master driving unit, only the auxiliary driving unit has been illustrated in detail and from which illustration the master driving unit will be easily understood.

While the conveying system ordinarily is designed to operate with only one master driving unit, it may embrace any desired number of auxiliary driving units and all of which will operate synchronately and in the manner hereafter described.

The speed changing device 26, the controlling mechanism 24 and the speed reduction gear 23 of the auxiliary units 17 all are rigidly secured by bolts or other suitable means indicated at 29 to a fabricated steel or other suitable frame such as that indicated at 31 and which in the present instance is formed by the employment of a pair of parallel angle bars 32 and 33 and across which a plurality of pairs of angle bars 34, 36 and 38 are rigidly secured for supporting the aforementioned units 26, 24, and 23 respectively. The bars are secured together in any suitable manner by welding, rivets, belts or other suitable means.

The Reeves speed changing device employed in all the driving units and which is a well known mechanism in the conveyer art, consists of a pair of parallel side frames 41 and 42 across which are rotatably supported in bearings 43 a parallel pair of shafts 44 and 46. Splined on these shafts are cone-shaped pairs of driving members 48 and 49, the two driving members on each side of each pair being pivotally secured to beams 51 and 52 by pins indicated at 53. The beams in turn are pivotally supported upon the speed changing device frame by pins 54 and 56 which project through the beams substantially midway between the shafts 44 and 46.

At one end of the mechanism the beams 51 and 52 project beyond the shaft 44 and there are pivotally secured, as is indicated at 57, to blocks operatively engaging oppositely threaded portions 58 and 59 of a shaft 61 which in turn is rotatably mounted adjacent the opposite ends thereof in bearings formed in the side frames 41 and 42. On one end of this shaft is disposed a driving gear 62 which is connected by a chain 63 to the driving gear 64 of a small reversible and variable speed motor 66. A bracket 67, rigidly secured to the side frame 42, provides a suitable support for the motor 66.

When the motor rotates the shaft 61 in one direction, for example, the ends of the beams 51 and 52 threadably connected to the shaft by the blocks 57 are brought closer together, whereas by reason of the pivotal mountings at 54 and 56 the opposite ends of the beams are separated to a greater extent. Under such circumstances and inasmuch as one of each pair of the cone-shaped members 48 and 49 is connected to one of the beams 51 and 52, the aforesaid movement of the beams will cause the cone-shaped members 48 to progressively approach one another, whereas the cone-shaped members 49 will separate proportionally. If the shaft 61 is rotated in the opposite direction, the movement of the cone-shaped members will be the same as before except in the opposite direction.

In order to provide means for driving one of the shafts 44 and 46 from the other, there is disposed upon the pairs of conical driving members 48 and 49 a driving belt 68 which is formed by securing flexibly together a plurality of transversely disposed and rigid blocks 69. The blocks have inclined ends which are engaged by the conical members various distances from the axes thereof, depending upon the distances apart at which the conical members are located by the operation of the motor 66. In order to positively drive the shaft 44 there is provided on an end thereof extending beyond the side frame 41, a gear 71 which is operatively associated with a chain 72 driven by a pulley 73 rigidly secured upon the end of a motor shaft 74. The motor 76 for driving the shaft 74, is rigidly secured to a base plate 77 which is adjustably attached to the upper extremity of the side frames 41 and 42 by bolts indicated at 78. The shaft 44, which is driven by the motor 76 through the aforesaid gears and chain, in turn drives the shaft 46 through the belt 68 and the speed ratio between the two shafts is variable in response to the operation of the motor 66 in accordance with the position of the conical drive members 48 and 49.

The controlling mechanism 24 which is located upon the frame 31 at one side of the speed changing mechanism 26, has projecting therefrom a shaft 81 which is connected by a shaft coupling 82 with an end of the shaft 46 projecting beyond the side member 41 of the speed changing device frame. This shaft is received in one of a pair of aligned openings formed between upper and lower sections 83 and 84 respectively of a controlling mechanism casing 86. In this opening the shaft is journaled in a rigidly secured pair of oppositely disposed thrust bearings 87 and 88. Inside the casing 86 the end of the shaft 81 is provided with a pinion 89 rigidly secured thereon and which meshes with a larger gear 91 which is keyed or otherwise rigidly secured intermediate the end of a short countershaft 92. Adjacent the gear 91 the shaft 92 also has rigidly secured thereto a gear 93 corresponding in size to the driving pinion 89 previously mentioned and which meshes with a gear 94 corresponding in size to the gear 91. The gear 94 is rigidly secured upon the end of a shaft 99 projecting inwardly of the casing 86 through the remaining one of the aforesaid pair of openings formed therein, and is in axial alignment with the shaft 81 and the gear 89. The shaft 99, like the shaft 81, is journaled in a pair of roller bearings 101 and 102 which are similar in every respect to the bearings 87 and 88 respectively.

For supporting the shaft 92 the casing 86 has disposed therein a laterally projecting yoke or balancing arm 103 in which the opposite ends of the shaft 92 are journaled, as indicated at 104 and 106, and which in turn is journaled at one end in concentric relation to the shafts 81 and 99 upon bearings 107 and 108 formed at the inner extremity of sleeves 109 and 111 respectively and in the interiors of which the pairs of bearings 87, 88 and 101 and 102 are likewise respectively secured.

When the shaft 99 is loaded and the shaft 81 is driven positively by the operation of the motor 76, it is apparent that the shaft 99 will tend to remain stationary and the balancing arm assembly or differential mechanism 103 to rotate in a direction opposite the shaft 81 with the gears 91 and 93 rotating idly therewith. However, when the yoke 103 is held against rotation the shaft 81 will drive the shaft 99 at a reduced speed and in the same direction of rotation. The speed reduction between the two shafts will be equal to the product of the number of teeth in gears 89 and 93 divided by the product of the number of teeth in gears 91 and 94.

The means employed for normally holding the yoke 103 against rotation in order to insure the driving of the shaft 99 by the shaft 81 will be more fully described hereinafter.

Connected to the shaft 99 by a coupling 112 is a shaft 113 of the worm reduction gear unit 23, which has a driven shaft 114. A flanged driving collar 117 is rigidly secured to the lower end of the shaft 114 and the sprocket wheel is secured to the collar 117 by shear pins 116. While any type of conveyer may be employed with the mechanism herein disclosed, in the present instance there is employed a chain 11 consisting of single links 118 connected between pairs of double links 119 by suitable interconnecting pins. The single links 118 are centrally slotted to receive carriers 121, the upper extremities of which are bifurcated to provide lugs 122 supporting pairs of oppositely disposed rollers 123. These rollers are adapted to rest upon the opposite lower flanges 124 of I-beams 128 supported in any suitable manner and at any desired elevation throughout the factory or other place where the mechanism is employed. Should the load on the chain become great enough to be likely to break some part of the mechanism by which the sprocket wheel 16 is driven, the pins 116 will be sheared off and the sprocket wheel released to rotate freely, upon shaft 114.

The mechanism for normally holding the yoke 103 in position (see particularly Figs. 4 and 6) includes a balancing mechanism 131 supported by a tubular casing 132 which is secured in a vertical position at the lower end thereof in an opening formed in the upper section 83 of the controller casing 86 and directly above the outer extremity of the arm 103. Inside this tubular support is a long rod 133, the lower end of which is threaded into a block 134 having an elongated opening 136 therein through which projects a pin 137 secured at its opposite end between a pair of lugs 138 formed at the outer end of the arm 103. The rod is slidably mounted adjacent its lower extremity in an annular collar 141 secured rigidly adjacent the lower extremity of the tubular member 132 while an intermediate portion of the rod is likewise slidably disposed in an annular collar 142 secured rigidly by studs 143 in an intermediate portion of the tubular member 132. Above the collar 142 and resting at its lower extremity thereon, is a coil spring 146, the upper extremity of which engages a washer 147 held in place upon the rod 133 by a nut 148.

It will be apparent that the spring 146 will resiliently oppose the downward movement of the free end of the arm 103.

Above the nut 148 there is secured between a spaced pair of lock nuts 151 a weight supporting plate 152 on which any desired number of weights 153, necessary to balance the arm 103, may be placed. The bottom of the weight supporting plate 152 has secured thereto a curved leaf spring 154 to the free end of which a link 156 is pivotally secured, as is indicated at 157. The opposite end of the link is secured, by a pivotal connection indicated at 158, to the free end of an arm 159 having a transversely disposed boss portion 161 formed therein which is rotatably secured, by a washer and cotter key indicated at 162, on the outer end of a fulcrum pin indicated at 163. The pin 163 which projects forwardly from adjacent the upper extremity of the tubular member 132, is threaded as is indicated at 164, in an opening formed in a boss 166 projecting from an annular split ring 167 which is clamped around the upper extremity of the tubular member 132. The boss 161, from which the arm 159 projects, has extending laterally therefrom a pair of oppositely disposed arms 171 and 172 each arranged in position to engage one of the actuating rods 173 and 174 of a pair of carbon pile rheostats 176 and 177 all respectively. These rheostats are vertically secured in parallel relation upon the front of the tubular supporting member 132 by a pair of brackets 178 and 179 engaging the rheostats and the supporting member adjacent the opposite ends of the former. Secured in a horizontal position, by a bolt 181 engaging the central portion of the bracket 178, is a leaf spring 180 the opposite extremities of which engage the upper ends of the actuating rods 173 and 174 of the rheostats 176 and 177 and tend to maintain the rods in their normal upper limiting positions. In such positions the rods open switches located internally of the rheostats 176 and 177 and which normally prevent the flow of electrical energy therethrough.

One of the rheostats 176 is connected in an electrical circuit through the speed changing device actuating motor 66 normally causing rotation of the motor in one direction while the other rheostat 177 is connected in a circuit with the motor normally tending to rotate the motor in the opposite direction.

When, for example, the load on the chain 11 increases in the vicinity of one of the auxiliary driving units 17, the arm 103 of such unit tends to move upwardly in opposition to the weights 153 and in so doing actuates the spring 154 in such manner as to rotate the boss 161 upon the pin 163 and to depress the arm 171 against the actuating rod 173 of the rheostat 176. The first thing to occur when this rod is depressed is the closing of the switch of the rheostat and consequently an electrical current flows through the motor 66 which tends to rotate the motor in such direction as to separate conical members 48 and bring closer together the conical members 49. This adjustment of the speed changing mechanism immediately decreases the rate of rotation of the shaft 46 and likewise the shaft 81 and as a result of which the sprocket wheel 14 slows down and throws the excess load on the other driving units. As soon as the load on this unit is thus decreased, the arm 103 will no longer be urged upwardly beyond its normal position but may be urged below its normal position by the relative increase in the speed of the chain acting through the driven shaft 99, in which event the arm 172 will depress the actuating rod of the rheostat 177 thereby causing a flow of electrical energy in the opposite direction through the motor 66 and instituting its rotation in a direction opposite to that in which it previously was rotated by the upward movement of the arm 103. In such event the cone shaped members 48 will be brought more closely together and the members 49 separated to a greater extent, thus changing the driving ratio between the shafts 44 and 46 to cause the latter and the shaft 81 to slightly increase its speed relative to the speed of shaft 99. In this manner the speed changing device driving motor 66 will be actuated in opposite directions until the arm 103 finally assumes its normal intermediate position in which the auxiliary unit under consideration carries its proportionate share of the entire load upon the chain.

In order to prevent the arm 103 from speeding up the chain to an undesirable extent, when the chain may be substantially unloaded, there is provided, in the lower half 84 of the casing 86, a stop 186 comprising a bolt adjustably threaded in an integral boss 187 formed in the casing section 84 directly below the arm. This stop may be secured in any desired position by the manipulation of a lock nut 188.

Above the arm 103 there also is located in the casing 86 a stop 191 which normally prevents the speed of the unit being decreased beyond certain limits by the upward movement of the arm 103 which might be caused by an excessive load upon the conveyer. This stop, which is somewhat different from the stop 186, comprises essentially a bolt 192 slidably disposed in the opening in a boss 194 formed in the upper half of the casing 86 and the head of which normally is adjustably positioned relative to the arm 103 by a pair of lock nuts 196 secured upon the bolt on the outside of the casing. The lock nuts 196 normally are held against the casing by a heavy coil spring 197 surrounding the bolt inside the casing and engaging the latter at the upper extremity of the spring while the lower extremity thereof rests upon a washer 198 which is supported by the head of the bolt. The spring 197 exerts such a large force against the head of the bolt 192 that under normal circumstances the bolt actually will stop the upward movement of the arm 103 upon the occurrence of a slightly excessive load which might affect the conveyer, although should the load become large enough to introduce the possibility of breaking some part of the apparatus, the spring will be compressed in response to the upward movement of the bolt. Outside the casing 86 there is disposed an electrical switch 199 having an arm 201 engaged by the upper extremity of the bolt 192 and which arm will open an electrical circuit through the switch whenever the load is increased to an undesirable extent, and the end of the bolt pushes the arm upwardly. The switch 199 is connected in series with the driving motor 76 of one of the auxiliary units or in series with the driving motors of all of the units which may be employed on a single conveyer and consequently will stop the operation of the entire apparatus under the aforesaid conditions. This switch and the actuating mechanism therefor may be applied to all of the auxiliary units in addition to the employment of the brake pins 116 holding the sprocket wheels in position, or the brake pins may be eliminated if desired on the auxiliary units and employed only on the sprocket wheel of the master driving unit.

The Reeves speed changing device employed in the master driving unit 18, illustrated by Fig. 1, is practically identical to the speed changing devices employed in the auxiliary driving units such as is illustrated in detail in Figs. 2 and 3, except for the fact that the adjustment therefor is manually actuated by a hand wheel 203 secured to an adjusting shaft, such as that indicated by 61, instead of by the employment of an electrical motor such as that indicated at 66. This manually adjustable speed changing unit is provided with a driven shaft 204 which may be connected directly to the driving shaft of the worm reduction gear 19 or may be connected thereto by the employment of gears 204 and 206 in combination with a chain 208.

When the article conveying system is in operation and it is desired to increase the speed of the chain 12 and thus to increase the production rate in the production line with which the conveying system is associated, it is necessary merely to rotate the hand wheel 203 and in response to which the speed changing device 21 varies the ratio between the driving and driven shafts of the speed changing device and consequently increases the speed of operation of the master driving unit sprocket wheel 16. The sprocket wheel thus tends to drive the chain 11 at a greater speed than before and in which event the balancing arms 103 of the more slowly driven auxiliary driving units 17 will tend to fall in response to the effect of the weights 153 and the increased speed of the driven shaft 99. Such downward movement of the weights will result in the depression of the carbon pile rheostat actuating rods 174 and a circuit will be closed through the Reeves speed adjusting motors 66 of all of the auxiliary units of the system. The operation of these motors will so adjust the speed changing devices of all of the auxiliary units as to increase the speed of the sprocket wheels driven thereby and, by the reverse operation as has been heretofore described, the balancing arms 103 will assume an intermediate position when the sprocket wheels of the auxiliary units are driven at a rate substantially equal to the rate of movement of the sprocket wheel 16 of the master driving unit 18.

In order to decrease the rate of operation of the conveying system, the master driving unit is adjusted in exactly the same manner as before except that the wheel 203 is rotated in the opposite direction.

It may be desirable in certain installations to employ a slightly modified structure such as that illustrated by Fig. 8. This device is designed to permit considerable variation in load without any appreciable variation in speed and which condition might be desirable in a conveying or other mechanism when starting up the latter at no load other than the load imposed on the mechanism in carrying the weight of its parts. For accomplishing this result the rod 133 is provided with a weight 150 which is secured between the nuts 151 in place of the plate 152 embraced in the structure previously described. Several of the weights 150 of different sizes may be kept available for obtaining variable conditions of operation in the mechanism. The weight 150 is considerably smaller in diameter than the weights 153 in order to permit the latter to rest upon a bracket 155, the lower part of which is secured adjustably upon the outer surface of the ring 167 or in any desired position upon the tubular member 132. The upper edge of the bracket 155 is adapted to be so positioned that it will partially or totally support the weights 153 when the balancing arm 103 is in its normal intermediate position between the stops 186 and 191.

The remainder of the mechanism illustrated by Fig. 8 is substantially the same as that illustrated in the preceding figures and the same reference numerals are applied to corresponding parts of the two structures wherever applicable.

In the modified structure, when the mechanism is started up, the balancing arm 103 will assume its normal intermediate position before the load on the mechanism is applied or when only partially applied, and will remain in such position until the load increases to a desired maximum or to any other predetermined limit. During such interval the load represented by the weights 153 will be progressively transferred from the bracket 155 to the upper surface of the weight 150 and will be entirely supported by the latter when the desired maximum or predetermined load has been applied. Any increase in the load upon the mechanism beyond this limit, however, will raise the weights 153 off of the bracket 155 and the mechanism thereafter will be slowed down through the operation of the arms 171 and 172 operating the rheostats 176 and 177 respectively, as hereinbefore described.

While the structure herein disclosed constitutes a preferred form and application of the invention, it is to be understood that there are numerous other modified and equivalent structures all within the scope of the invention defined by the appended claims.

I claim:

1. In an article conveying system, a conveying chain, a driving and speed governing means engaging and driving said chain, said speed governing means having means thereon for adjusting the speed of operation thereof, an additional driving unit engaging and driving said chain at spaced interval along the length of said chain, said additional driving unit being connected to said chain and comprising a source of power, a speed varying device connected therewith for transmitting driving torque therefrom, a movable speed reduction differential mechanism having a torque transmitting connection with said speed variable device and also with said speed governing means, and movable in response to a differential in torque between said speed varying means and said speed governing means, and means for varying said speed varying device controlled by the movement of said differential mechanism and operating continuously to vary the speed of the speed varying device while said movable mechanism is in a position other than its predetermined normal position.

2. In an article conveying system, a conveyer chain, a driving and speed governing means engaging and driving said chain, said speed governing means having means thereon for manually adjusting the speed of operation thereof, an additional driving unit engaging and driving said chain at spaced interval along the length of said chain, said additional driving unit being connected to said chain and comprising a source of power, a speed varying device connected therewith for transmitting driving torque therefrom, a movable speed reduction differential mechanism, having a torque transmitting connection with said speed variable device and also with said speed governing means through said chain, and movable in response to a differential in torque between said speed varying device and said speed governing means, and means for varying said speed varying device controlled by the movement of said differential mechanism and operating continuously to vary the speed of the speed varying device while said movable mechanism is in a position other than its predetermined normal position to thereby balance the loads carried by said driving units along the length of the chain.

3. The combination with a continuous conveyer, of master and auxiliary drive units connected to different portions of said conveyer, said master drive unit including means for driving said conveyer at different predetermined speeds, said auxiliary drive unit including variable speed driving means and driven means, movable control means operatively connecting said driving and driven means and normally occupying a predetermined position, said movable means being movable in response to variations in the torque applied by the portion of said conveyer connected to said driven means, and means for varying said variable speed driving means controlled by said movable means and operating independently of the extent of movement of said movable means and continuing to operate while said movable means is in a position other than its predetermined normal position.

4. The combination of master and auxiliary drive units for advancing an element and connected to different portions thereof, said master drive unit including means for driving said element at different predetermined speeds, said auxiliary drive unit including variable speed driving means and driven means, movable control means operatively connecting said driving and driven means and normally occupying a predetermined position, said movable means being movable in response to variations in the torque applied by the portion of said element connected to said driven means, and means for varying said variable speed driving means controlled by said movable means and operating independently of the extent of movement of said control means and continuing to operate while said movable means is in a position other than its predetermined normal position.

LEONARD J. BISHOP.

CERTIFICATE OF CORRECTION.

Patent No. 2,128,795.   August 30, 1938.

LEONARD J. BISHOP.

It is hereby certified that error appears in the printed specification of the above numbered patent requiring correction as follows: Page 5, second column, line 39, claim 1, after "position" and before the period, insert the words to thereby balance the loads carried by said driving units along the length of the chain; and that the said Letters Patent should be read with this correction therein that the same may conform to the record of the case in the Patent Office.

Signed and sealed this 11th day of October, A. D. 1938.

Henry Van Arsdale (Seal)   Acting Commissioner of Patents.

portion of said conveyer connected to said driven means, and means for varying said variable speed driving means controlled by said movable means and operating independently of the extent of movement of said movable means and continuing to operate while said movable means is in a position other than its predetermined normal position.

4. The combination of master and auxiliary drive units for advancing an element and connected to different portions thereof, said master drive unit including means for driving said element at different predetermined speeds, said auxiliary drive unit including variable speed driving means and driven means, movable control means operatively connecting said driving and driven means and normally occupying a predetermined position, said movable means being movable in response to variations in the torque applied by the portion of said element connected to said driven means, and means for varying said variable speed driving means controlled by said movable means and operating independently of the extent of movement of said control means and continuing to operate while said movable means is in a position other than its predetermined normal position.

LEONARD J. BISHOP.

CERTIFICATE OF CORRECTION.

Patent No. 2,128,795.                  August 30, 1938.

LEONARD J. BISHOP.

It is hereby certified that error appears in the printed specification of the above numbered patent requiring correction as follows: Page 5, second column, line 39, claim 1, after "position" and before the period, insert the words to thereby balance the loads carried by said driving units along the length of the chain; and that the said Letters Patent should be read with this correction therein that the same may conform to the record of the case in the Patent Office.

Signed and sealed this 11th day of October, A. D. 1938.

Henry Van Arsdale (Seal)                                      Acting Commissioner of Patents.